United States Patent
Yu et al.

(10) Patent No.: US 9,941,818 B2
(45) Date of Patent: Apr. 10, 2018

(54) MICRO INCHWORM-TYPE PIEZOELECTRIC-DRIVEN ROTATING JOINT MECHANISM

(71) Applicant: HEFEI UNIVERSITY OF TECHNOLOGY, Hefei, Anhui (CN)

(72) Inventors: Liandong Yu, Anhui (CN); Chengliang Pan, Anhui (CN); Liling Han, Anhui (CN); Huaxia Deng, Anhui (CN); Weishi Li, Anhui (CN); Haojie Xia, Anhui (CN); Wei Zhang, Anhui (CN); Siying Lu, Anhui (CN)

(73) Assignee: HEFEI UNIVERSITY OF TECHNOLOGY, Hefei, Anhui (CN)

( * ) Notice: Subject to any disclaimer, the term of this patent is extended or adjusted under 35 U.S.C. 154(b) by 223 days.

(21) Appl. No.: 14/917,012

(22) PCT Filed: Apr. 8, 2015

(86) PCT No.: PCT/CN2015/000245
§ 371 (c)(1),
(2) Date: Mar. 6, 2016

(87) PCT Pub. No.: WO2015/161670
PCT Pub. Date: Oct. 29, 2015

(65) Prior Publication Data
US 2016/0218641 A1    Jul. 28, 2016

(30) Foreign Application Priority Data
Apr. 26, 2014 (CN) .......................... 2014 1 0174406

(51) Int. Cl.
H02N 2/12 (2006.01)
H02N 2/10 (2006.01)
H02N 2/14 (2006.01)

(52) U.S. Cl.
CPC ............ *H02N 2/101* (2013.01); *H02N 2/103* (2013.01); *H02N 2/12* (2013.01); *H02N 2/14* (2013.01)

(58) Field of Classification Search
CPC .. H02N 2/10; H02N 2/12; H02N 2/14; H02N 2/101; H02N 2/103
(Continued)

(56) References Cited

U.S. PATENT DOCUMENTS

| | | | | |
|---|---|---|---|---|
| 6,806,621 B2 * | 10/2004 | Heim | ...................... | H02N 2/046 310/328 |
| 2004/0140736 A1* | 7/2004 | Richter | .................. | H02N 2/101 310/328 |
| 2006/0006764 A1* | 1/2006 | Ganor | ..................... | B26B 19/28 310/328 |

\* cited by examiner

*Primary Examiner* — Derek Rosenau

(57) ABSTRACT

A micro inchworm-type piezoelectric-driven rotating joint mechanism includes a U-shaped base, bearing pedestals, bearing brackets, bearing rings, piezoelectric ceramic plates, a rotating shaft, a rotating sleeve and end caps. Every bearing ring is divided into two half-rings which are coupled to the bearing pedestals via two bearing brackets. One end of every piezoelectric ceramic plate is fixed to one bearing pedestal, and the other end thereof is coupled to one bearing ring, so that every piezoelectric ceramic plate stretches and deforms under the driving of voltage for driving the bearing ring to achieve micro motions. Two bearing driving modules are respectively symmetrically mounted at two sides of the U-shaped base, and the rotating shaft is supported on the two bearing rings, so that the stepping motion of the rotating shaft is implemented by controlling the timing sequence of clamping, release and rotation of the two bearing driving modules.

7 Claims, 5 Drawing Sheets

(58) Field of Classification Search
USPC .............................. 310/323.01–323.21, 328
See application file for complete search history.

MICRO INCHWORM-TYPE PIEZOELECTRIC-DRIVEN ROTATING JOINT MECHANISM

CROSS REFERENCE OF RELATED APPLICATION

This is a U.S. National Stage under 35 U.S.C 371 of the International Application PCT/CN2015/000245, filed Apr. 8, 2015, which claims priority under 35 U.S.C. 119(a-d) to CN 201410174406.1, filed Apr. 26, 2014.

BACKGROUND OF THE PRESENT INVENTION

Field of Invention

The present invention relates to the driver field, and more particularly to a micro inchworm-type piezoelectric-driven rotating joint mechanism.

Description of Related Arts

In recent years, with the rapid development of physical chemistry, information electrics, bio-medical, environmental energy, material manufacturing and aeronautics and astronautics subjects, the occasions of precision measurement, operation and machining relating under micron and nanometer scale are increased, it is urgent for people to develop the micro-nano-precision positioning and driving technology. As the main functional component of the precision positioning driving system, the principle structure, manufacturing assembly and driving control of the driver have decisive influence on the performance of the whole system. Therefore, it becomes one of the key aspects for the micro-nano-precision positioning and driving technology to develop the new driver.

The conventional precision driver generally adopts the stepping motor based on the electromagnetic theory, so that it has a greater advantage under large size and common precision. However, for micron and nanometer positioning precision, and millimeter, submillimeter structural size, the conventional precision driver loses the advantages, its design and manufacturing have greater difficulties, serious heat generation and low efficiency, which is unable to meet the development requirements of modern high and new technology. With the development of piezoelectric-driven technology, the driver, which takes the piezoelectric ceramic as the core functional material, shows itself in the ultra-precise positioning driving field. The piezoelectric ceramic driver has advantages such as large energy density, rapid response speed, high resolution ratio, anti-electromagnetic interference, and low temperature vacuum environment resistance. The piezoelectric motor transfers the micro vibration of the piezoelectric component to the single-directionally continuous motion of the output shaft by friction transmission, so as to overcome the shortcoming of small stroke of the piezoelectric component itself, and the piezoelectric motor has simple structure, is easy to be miniaturized, has high torque under low speed and is able to self-lock. The piezoelectric stepping motor based on inertial impacting and inchworm principle is able to precisely adjust the micro pace, which effectively alleviates the contradiction between large stroke and high precision and shows good development prospects for large-stroke and ultra-precision positioning driving system.

As a typical precision positioning driving system, the micro-precision manipulator has application values in numerous occasions of the forefront of scientific research such as cell injection, particulate removal and microscopic detection, and advanced industrial production. Due to the rotating joint is a basically functional component of the micro-precision manipulator, the miniaturization of the rotating joint mechanism and the novel piezoelectric-driven rotating joint mechanism have great significance to be developed.

SUMMARY OF THE PRESENT INVENTION

A technical problem to be resolved of the present invention is to provide a micro inchworm-type piezoelectric-driven rotating joint mechanism, which has subtle structural improvement and is adapted for miniaturization. The whole joint mechanism adopts the symmetrically structural arrangement and the dual-clamping dual-rotating control method, has stable clamping force, improves operational efficiency and stability, optimizes the arrangement of piezoelectric ceramic plates, and reduces the complexity of the driving circuit. The joint mechanism is convenient for controlling.

To resolve the above technical problem, the present invention adopts the technical solution as follows.

A micro inchworm-type piezoelectric-driven rotating joint mechanism, comprises a U-shaped base having a U-shaped opening and a rotating sleeve horizontally clamped within the U-shaped opening of the U-shaped base, wherein a rotating shaft is rotatably mounted at a central axis of the rotating sleeve, two annular seats are respectively connected with two ends of the U-shaped base and are respectively coaxially connected with two sleeve mouths of the rotating sleeve, two annular bearing pedestals are respectively mounted within the two annular seats, two bearing brackets are respectively connected with an inner annular wall of the two annular bearing pedestals along a certain radial direction, a middle portion of the two bearing brackets is disconnected and is respectively connected with two integrally annular bearing rings, each of which is formed by two half-rings, the two integrally annular bearing rings are concentric with the two annular bearing pedestals, two piezoelectric ceramic plates are respectively symmetrically located at two sides of each of the bearing brackets which is connected with every half-ring of each of the two integrally annular bearing rings, every piezoelectric ceramic plate is parallel to the bearing brackets, one end of every piezoelectric ceramic plate is connected with an inner wall of every bearing pedestal, the other end of every piezoelectric ceramic plate is connected with an end of a half-ring of a bearing ring which is connected with a corresponding bearing bracket, electrodes are respectively deposited at an inner side face of every piezoelectric ceramic plate facing to a corresponding bearing bracket and an outer side face of every piezoelectric ceramic plate away from the corresponding bearing bracket; a bearing pedestal, a bearing bracket, and a bearing ring form a bearing unit; the bearing unit and four piezoelectric ceramic plates form a bearing driving module; two ends of the rotating shaft within the rotating sleeve respectively penetrate through the two bearing rings of two bearing units within the two annular seats; the two bearing rings apply a certain pre-clamping force to the rotating shaft.

Two end caps are respectively engaged with an end of the two annular seats away from the rotating sleeve.

Every piezoelectric ceramic plate has a single layer structure or a multilayer laminated structure.

Every bearing unit is wholly made of stainless steel, and a surface of an inner wall of every bearing ring makes a wear-resistant treatment or is sprayed with a wear-resistant material.

Two ends of every piezoelectric ceramic plate are adhesively bonded with both a corresponding bearing pedestal and a corresponding bearing ring via epoxy resin adhesive or AB glue.

The two bearing pedestals are respectively adhesively bonded within the two annular seats via epoxy resin adhesive or AB glue, or are respectively screwed into the two annular seats via a screwing method.

The two end caps are respectively adhesively bonded with an end of the two annular seats via epoxy resin adhesive or AB glue, or are respectively screwed at an end of the two annular seats via a screwing method, or are respectively snapped at an end of the two annular seats via a snap ring method.

In the present invention, under a certain voltage driving, the piezoelectric ceramic plates are able to stretch and deform for allowing the bearing rings to achieve clamping, releasing, rotating and other small actions. The rotating shaft is driven to move step by step by controlling a time sequence of clamping, releasing and rotating the piezoelectric ceramic plates.

In the present invention, a bearing pedestal, a bearing bracket, and a bearing ring form a bearing unit which is integrally molded; the bearing unit and four piezoelectric ceramic plates form a bearing driving module, the four piezoelectric ceramic plates are connected with one bearing pedestal and one bearing ring and symmetrically distributed within one bearing unit; the bearing driving module is connected with one annular seat via one bearing pedestal; the bearing rings and the rotating shaft maintain a certain pre-clamping force without applying voltage; the rotating shaft is rotatably mounted within the rotating sleeve and is adapted for mounting subsequent operating components; the two end caps are adapted for respectively protecting the two bearing driving modules within the base.

In the present invention, under the voltage driving, the piezoelectric ceramic plates are simultaneously stretched for allowing one bearing ring to clamp the rotating shaft; the four piezoelectric ceramic plates are simultaneously shortened for allowing one bearing ring to release the rotating shaft; the piezoelectric ceramic plates are staggeredly stretched or shortened for achieving the rotating displacement of the bearing rings, so as to drive the rotating shaft to slightly forwardly or reversely rotate.

Advantages of the present invention are as follows:

The present invention applies the inchworm-type piezoelectric-driven stepping motor technique to the micro precision operation hand joint driving mechanism, wherein the clamping function components and the rotating function components are integrated within one bearing driving module, so that the present invention has simple structure and is adapted for miniaturization. The whole joint mechanism adopts the symmetrically structural arrangement and the dual-clamping dual-rotating control method, has stable clamping force, improves operational efficiency and stability, optimizes the arrangement of piezoelectric ceramic plates, and reduces the complexity of the driving circuit. The joint mechanism is convenient for controlling.

DETAILED DESCRIPTION OF THE PREFERRED EMBODIMENT

Figure 1:
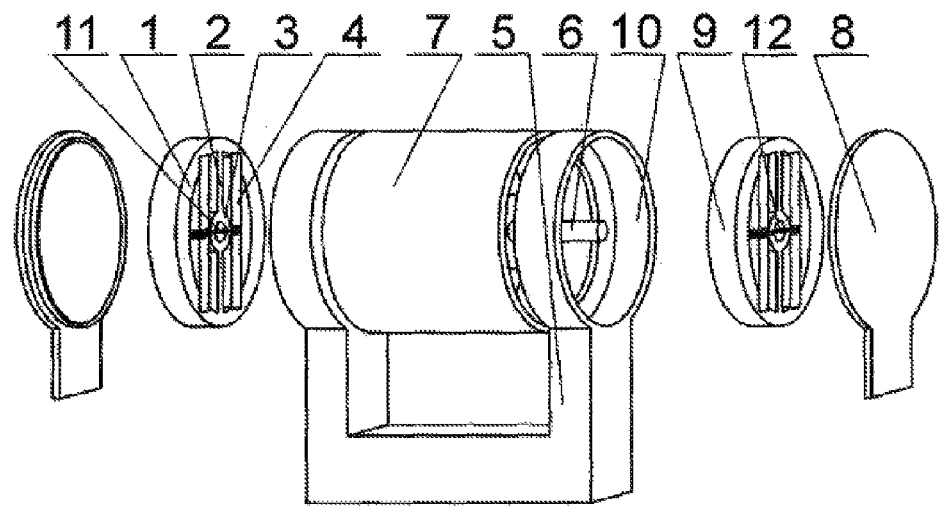
FIG. 1 is an axonometric drawing of a micro inchworm-type piezoelectric-driven rotating joint mechanism of the present invention.

Referring to FIGS. 1, 2, 3 and 4 of the drawings, a micro inchworm-type piezoelectric-driven rotating joint mechanism according to a preferred embodiment of the present invention is illustrated, comprising a U-shaped base 5 having a U-shaped opening, and a rotating sleeve 7 horizontally clamped within the U-shaped opening of the U-shaped base 5. A rotating shaft 6 is rotatably mounted at a central axis of the rotating sleeve 7. Two annular seats 10 are respectively connected with two ends of the U-shaped base 5 and are respectively coaxially connected with two sleeve mouths of the rotating sleeve 7. Two annular bearing pedestals 1 are respectively mounted within the two annular seats 10. Two bearing brackets 2 are respectively connected with an inner annular wall of the two annular bearing pedestals 1 along a certain radial direction. A middle portion of the two bearing brackets 2 is disconnected and is respectively connected with two integrally annular bearing rings 3, each of which is formed by two half-rings. The two integrally annular bearing rings 3 are concentric with the two annular bearing pedestals 1. Two piezoelectric ceramic plates 4 are respectively symmetrically located at two sides of each of the bearing brackets 2 which is connected with every half-ring of each of the two integrally annular bearing rings 3. Every piezoelectric ceramic plate 4 is parallel to the bearing brackets 2. One end of every piezoelectric ceramic plate 4 is connected with an inner wall of every bearing pedestal 1, and the other end thereof is connected with an end of a half-ring of a bearing ring 3 which is connected with a corresponding bearing bracket 2. Electrodes are respectively deposited at an inner side face of every piezoelectric ceramic plate 4 facing to a corresponding bearing bracket 2 and an outer side face of every piezoelectric ceramic plate 4 away from the corresponding bearing bracket 2. A bearing pedestal 1, a bearing bracket 2, and a bearing ring 3 form a bearing unit 9. The bearing unit 9 and four piezoelectric ceramic plates 4 form a bearing driving module. Two ends of the rotating shaft 6 within the rotating sleeve 7 respectively penetrate through the two bearing rings 3 of two bearing units 9 within the two annular seats 10. The two bearing rings 3 apply a certain pre-clamping force to the rotating shaft 6.

Two end caps 8 are respectively engaged with an end of the two annular seats 10 away from the rotating sleeve 7.

Every piezoelectric ceramic plate 4 has a single layer structure or a multilayer laminated structure.

Every bearing unit 9 is wholly made of stainless steel, and a surface of an inner wall of every bearing ring 3 makes a wear-resistant treatment or is sprayed with a wear-resistant material.

Two ends of every piezoelectric ceramic plate 4 are adhesively bonded with both a corresponding bearing pedestal 1 and a corresponding bearing ring 3 via epoxy resin adhesive or AB glue.

The two bearing pedestals 1 are respectively adhesively bonded within the two annular seats 10 via epoxy resin adhesive or AB glue, or are respectively screwed into the two annular seats 10 via a screwing method.

The two end caps 8 are respectively adhesively bonded with an end of the two annular seats 10 via epoxy resin adhesive or AB glue, or are respectively screwed at an end of the two annular seats 10 via a screwing method, or are respectively snapped at an end of the two annular seats 10 via a snap ring method.

According to structural characteristics of micro manipulators, the present invention applies the inchworm-type piezoelectric stepping motor technology to the micro manipulators, so as to provide a new micro piezoelectric-driven rotating joint mechanism.

In the present invention, under a certain voltage driving, the piezoelectric ceramic plates 4 are able to stretch and deform along a length direction for allowing the bearing rings 3 to drive the rotating shaft 6 to achieving clamping, loosening, rotating and other small actions. The single bearing driving module has the clamping and rotating function at the same time. Two bearing driving modules 11 and 12 are respectively located at two sides of the base 5, and support the rotating shaft 6 by a certain pre-clamping force. The rotating shaft 6 is driven to move step by step by controlling a time sequence of clamping, loosening and rotating the two bearing driving modules 11 and 12. A voltage amplitude of the clamping signal and the rotating signal is adjusted to adjust the clamping force and the stepping rotating angle. A frequency of the control signal is controlled to adjust a frequency of the stepping motion.

Figure 2:
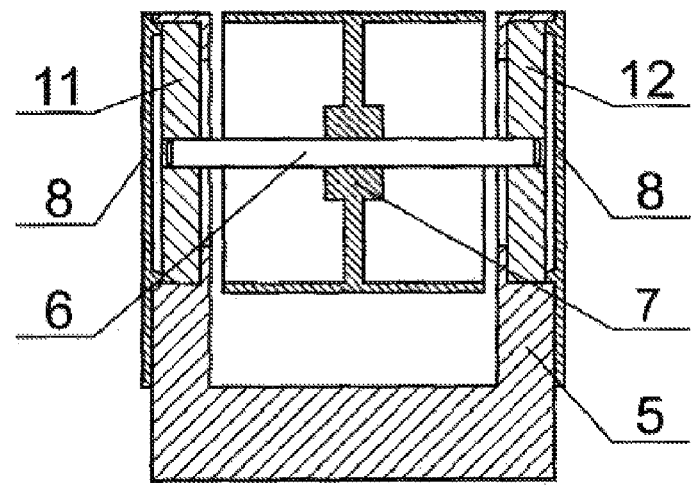
FIG. 2 is a main sectional view of the micro inchworm-type piezoelectric-driven rotating joint mechanism of the present invention.

Every bearing driving module has two control schemes. As shown in FIG. 2, the first control scheme is that the two bearing driving modules 11 and 12 simultaneously achieve the clamping and rotating function, and alternately drive the rotating shaft to rotate, so that one working cycle is able to achieve two stepping motions; the second control scheme is that one bearing driving module takes charge of clamping and rotating, the other bearing driving module only takes charge of clamping, so that one working cycle is only able to achieve one stepping motion.

The specific implementation of the first control scheme is as follows.

Initially, the two bearing driving modules support the rotating shaft by a certain pre-clamping force; while starting a working cycle, the bearing driving module 11 clamps the rotating shaft, the bearing driving module 12 releases the rotating shaft and simultaneously produces small rotational displacements; the bearing driving module 11 holds the clamping state and drives the rotating shaft to slightly stepping rotate, the bearing driving module 12 holds the release state and rotates back to the initial position; the bearing driving module 11 releases the rotating shaft, the bearing driving module 12 clamps the rotating shaft; the bearing driving module 12 holds the clamping state and drives the rotating shaft to slightly stepping rotate, the bearing driving module 11 holds the release state and rotates back to the initial position; go into a next working cycle, the bearing driving module 11 clamps the rotating shaft, and the bearing driving module 12 simultaneously releases the rotating shaft, so as to sequentially alternately operate, thus one working cycle achieves the two stepping rotating motion.

The specific implementation of the second control scheme is as follows.

Initially, the two bearing driving modules support the rotating shaft by a certain pre-clamping force; while starting a working cycle, the bearing driving module 11 clamps the rotating shaft, the bearing driving module 12 releases the rotating shaft; the bearing driving module 11 holds the clamping state and drives the rotating shaft to slightly stepping rotate, the bearing driving module 12 holds the release state; the bearing driving module 11 releases the rotating shaft, the bearing driving module 12 clamps the rotating shaft; the bearing driving module 11 holds the release state and rotates back to the initial position, the bearing driving module 12 holds the clamping state; go into a next working cycle, the bearing driving module 11 clamps the rotating shaft, and the bearing driving module 12 simultaneously releases the rotating shaft, so as to sequentially alternately operate, thus one working cycle only achieves the one stepping rotating motion. Compared with the first control scheme, the second control scheme loses a half of stepping rotating speed, but avoids the problem from the two bearing driving modules due to stepping displacement difference.

Figure 3:
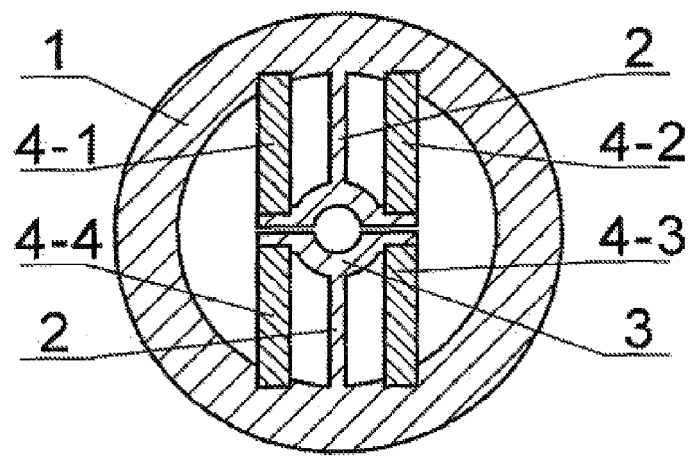
FIG. 3 is a main sectional view of a bearing driving module of the micro inchworm-type piezoelectric-driven rotating joint mechanism of the present invention.

Every bearing driving module of the present invention comprises four piezoelectric ceramic plates 4, as shown in FIG. 3. The four piezoelectric ceramic plates 4-1, 4-2, 4-3 and 4-4 are simultaneously stretched for allowing the bearing ring to clamp the rotating shaft. The four piezoelectric ceramic plates 4-1, 4-2, 4-3 and 4-4 are simultaneously shortened for allowing the bearing ring to release the rotating shaft. The piezoelectric ceramic plates 4-1 and 4-3 are stretched, and the piezoelectric ceramic plates 4-2 and 4-4 are shortened for allowing the bearing ring to slightly forwardly rotate. The piezoelectric ceramic plates 4-1 and 4-3 are shortened, and the piezoelectric ceramic plates 4-2 and 4-4 are stretched for allowing the bearing ring to slightly reversely rotate. Every bearing driving module has the clamping and rotating function at the same time, so that while adopting the electrode segmentation method, the polarization method and the voltage driving method for piezoelectric ceramic plates, there are two basic driving schemes, wherein one scheme is that the clamping and rotating function is achieved by the whole piezoelectric ceramic plates, so as to apply the superposed signal including clamping and rotating, the other scheme is that the clamping function and the rotating function are respectively achieved by two parts of the piezoelectric ceramic plates, so as to respectively apply the clamping signal and the rotating signal.

The specific implementation of the first driving scheme is as follows.

Figure 4:
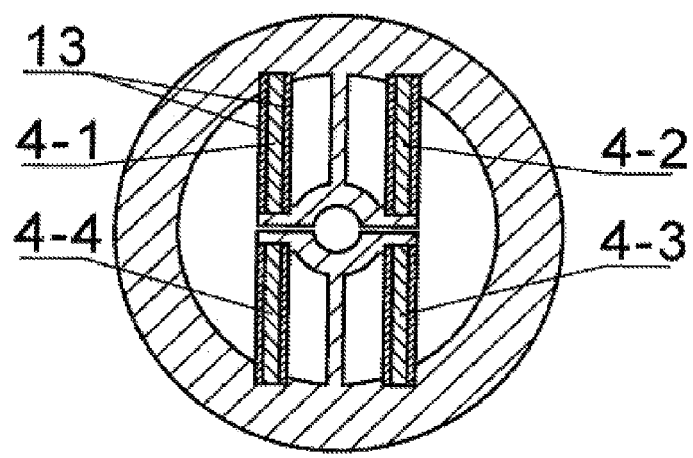
FIG. 4 shows an electrode arrangement of the micro inchworm-type piezoelectric-driven rotating joint mechanism according to a first driving scheme of the present invention.
Figure 5:
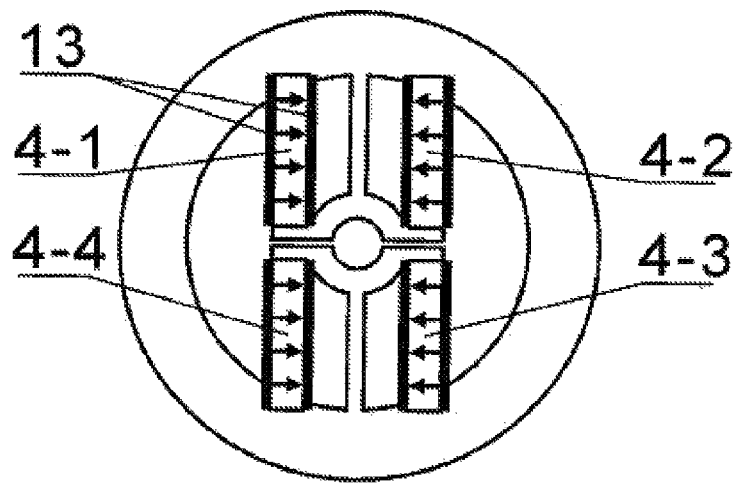
FIG. 5 shows a polarization direction of the micro inchworm-type piezoelectric-driven rotating joint mechanism according to the first driving scheme of the present invention.
Figure 6:
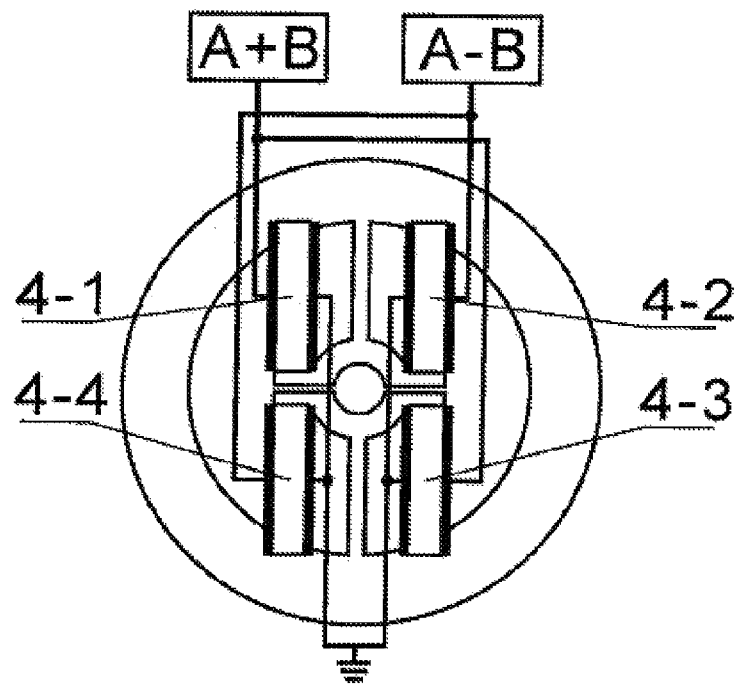
FIG. 6 shows a driving method of the micro inchworm-type piezoelectric-driven rotating joint mechanism according to the first driving scheme of the present invention.

An electrode of every piezoelectric ceramic plate is a whole, as shown in FIG. 4. An electrode 13 is integrally plated on two surfaces of every piezoelectric ceramic plate, a unified polarization method thereof is shown in FIG. 5, and a voltage driving method thereof is shown in FIG. 6. During the driving process, inner electrodes of the four piezoelectric ceramic plates are unified grounded. Due to the same polarization method, the clamping control signals of the four piezoelectric ceramic plates are identical, and the rotating control signals of every two adjacent piezoelectric ceramic plates are opposite, thereby two driving circuits need to be respectively motivated. A is the clamping control signal, B is the rotating control signal, the driving signal of the piezoelectric ceramic plates 4-1 and 4-3 is A+B, the driving signal of the piezoelectric ceramic plates 4-2 and 4-4 is A−B. A voltage range of A+B and A−B should be in an allowable range of every piezoelectric ceramic plate. An amplitude distribution of the A and B signals is adjusted according to a need for the clamping force and the stepping rotating angle.

The specific implementation of the second driving scheme is as follows.

Figure 7:
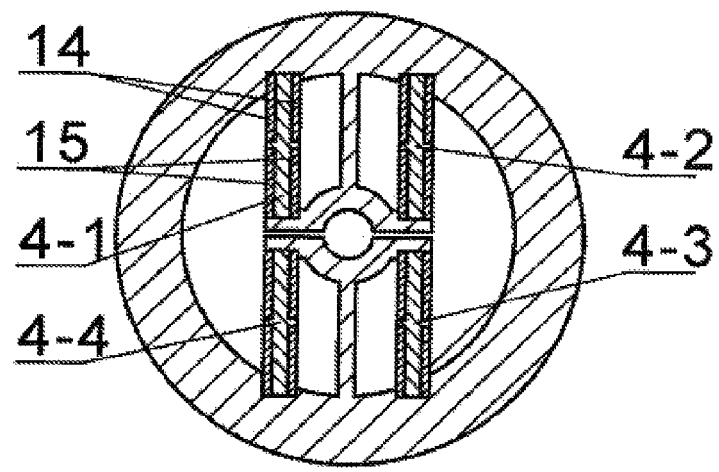
FIG. 7 shows an electrode arrangement of the micro inchworm-type piezoelectric-driven rotating joint mechanism according to a second driving scheme of the present invention.
Figure 8:
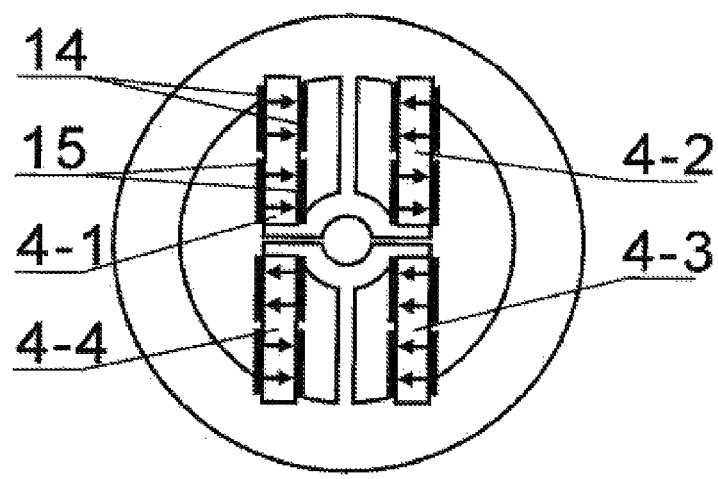
FIG. 8 shows a polarization direction of the micro inchworm-type piezoelectric-driven rotating joint mechanism according to the second driving scheme of the present invention.
Figure 9:
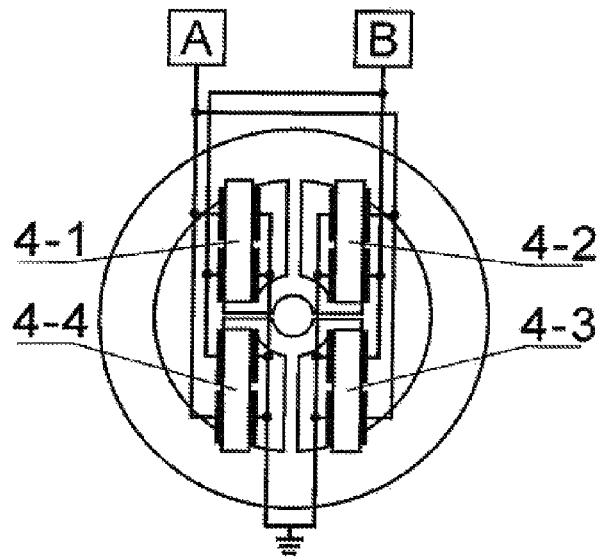
FIG. 9 shows a driving method of the micro inchworm-type piezoelectric-driven rotating joint mechanism according to the second driving scheme of the present invention.

An electrode of every piezoelectric ceramic plate is divided into two parts, as shown in FIG. 7. Two electrodes 14 and 15 are respectively plated on the two parts. The electrode 14 is adapted for the clamping control, and the electrode 15 is adapted for the rotating control. A ratio of the two parts is adjusted according to a need for the clamping force and the stepping rotating angle. A polarization method of the two parts is shown in FIG. 8. For allowing the clamping control of the four piezoelectric ceramic plates to share a common signal, the polarization methods of the four piezoelectric ceramic plates are identical. For allowing the rotating control of the four piezoelectric ceramic plates to share a common signal, the polarization methods of every two adjacent piezoelectric ceramic plates are opposite. A voltage driving method of the two parts is shown in FIG. 9. During the driving process, the inner electrodes of the four piezoelectric ceramic plates are unified grounded; due to the same polarization method of the clamping part, the clamping control signals of the four piezoelectric ceramic plates are identical; due to the staggeredly polarization method of the rotating part, the rotating control signals of the four piezoelectric ceramic plates are also identical, thereby only two driving circuits are needed for respectively controlling the clamping motion and the rotating motion. A is the clamping control signal, and B is the rotating control signal. A voltage range of the A and B signals should be in an allowable range of every piezoelectric ceramic plate. An amplitude value of the A and B signals is adjusted according to a need for the clamping force and the stepping rotating angle.

The present invention is further described accompanying with the drawings and the embodiments as follows.

Here, take the first control scheme and the second driving scheme as an example to describe the specific manufacturing process and the driving method of the micro inchworm-type piezoelectric-driven rotating joint mechanism of the present invention.

A bearing pedestal, a bearing bracket, and a bearing ring form a bearing unit. Every rotating joint mechanism needs two bearing units, referring to FIG. 3. A diameter of every bearing unit is 10-25 mm, a thickness thereof is 1-5 mm; every bearing pedestal is annular and has a notch structure for bonding with the piezoelectric ceramic plates, a width of every annular bearing pedestal is 1-4 mm; every bearing bracket has a rectangular-section beam structure for connecting the bearing pedestal with the bearing ring, a width of every bearing bracket is 0.5-2 mm; every bearing ring is annular and has two convex portions at two sides respectively for bonding with the piezoelectric ceramic plates, an inner diameter of every bearing ring is 0.5-5 mm, which matches with a diameter of the rotating shaft. Every bearing unit is wholly processed and formed and is obtained by linear cutting and precision milling machine. The surface of the inner wall of every bearing ring makes a wear-resistant treatment or is sprayed with the wear-resistant material. Every bearing ring is divided into two half-rings by linear cutting, and a gap between the two half-rings is 0.1-0.5 mm.

Every piezoelectric ceramic plate is the basic driving output member. Every rotating joint mechanism needs eight piezoelectric ceramic plates respectively mounted at two bearing units for forming two bearing driving modules, as shown in FIG. 3. A length of every piezoelectric ceramic plate is 3-10 mm, a width thereof is 1-5 mm, a thickness thereof is 0.2-2 mm, every piezoelectric ceramic plate has two faces, each face has two electrodes, the electrode 14 is adapted for clamping control, the electrode 15 is adapted for rotating control, wherein the electrodes are deposited on a surface of every piezoelectric ceramic plate by electroplating technology, and the electrodes are made of Ag, as shown in FIG. 7, an insulating space is reserved at a surface edge of every piezoelectric ceramic plate for mounting the piezoelectric ceramic plate. Before mounting, every piezoelectric ceramic plate needs to be polarized at 80° C. under silicone oil environment with a polarization electric field along a thickness direction and an electric field size of 2000-2500 V/mm for continuous over 25 min. There are two kinds of polarization methods. One polarization method is that the two parts have same polarization directions, and the other polarization method is that the two parts have opposite polarization directions. Negative and positive electrodes are marked while polarizing the electrodes. After polarization, every piezoelectric ceramic plate is cleaned by acetone. Referring to the polarization distribution shown in FIG. 8, every piezoelectric ceramic plate is mounted on the bearing unit, and two ends of every piezoelectric ceramic plate are respectively fixed within a notch of the bearing pedestal and on the convex portion of the bearing ring by epoxy resin adhesive or AB glue. The inner electrodes of the four piezoelectric ceramic plates are uniformly connected with a lead wire and connected with ground. Four outer electrodes for clamping are uniformly connected with a lead wire. Four outer electrodes for rotating are uniformly connected with a lead wire.

A size of the U-shaped base is able to be flexibly designed as required. The U-shaped base is made of aluminum alloy or stainless steel. The two bearing driving modules are respectively mounted at two sides of the U-shaped base. The bearing driving module 11 is mounted at a left side of the U-shaped based, and the bearing driving module 12 is mounted at a right side of the U-shaped based, as shown in FIG. 2, every bearing pedestal is rigidly connected with the U-shaped base by epoxy resin adhesive or AB glue. The rotating shaft is made of stainless steel material, a length of the rotating shaft matches with a span of two ends of the U-shaped base, a diameter of the rotating shaft matches with that of every bearing ring, so as to allowing every bearing ring and the rotating shaft to maintain a certain pre-clamping force without applying voltage for self-locking. The rotating sleeve is adapted for protecting the bearing driving modules and is designed for allowing to mounting subsequent operating components. The rotating sleeve is fixedly connected with the rotating shaft by epoxy resin adhesive, AB glue or welding. The two end caps are respectively mounted on the annular seats by epoxy resin adhesive, AB glue or snap ring for protecting the bearing driving modules.

Figure 10:
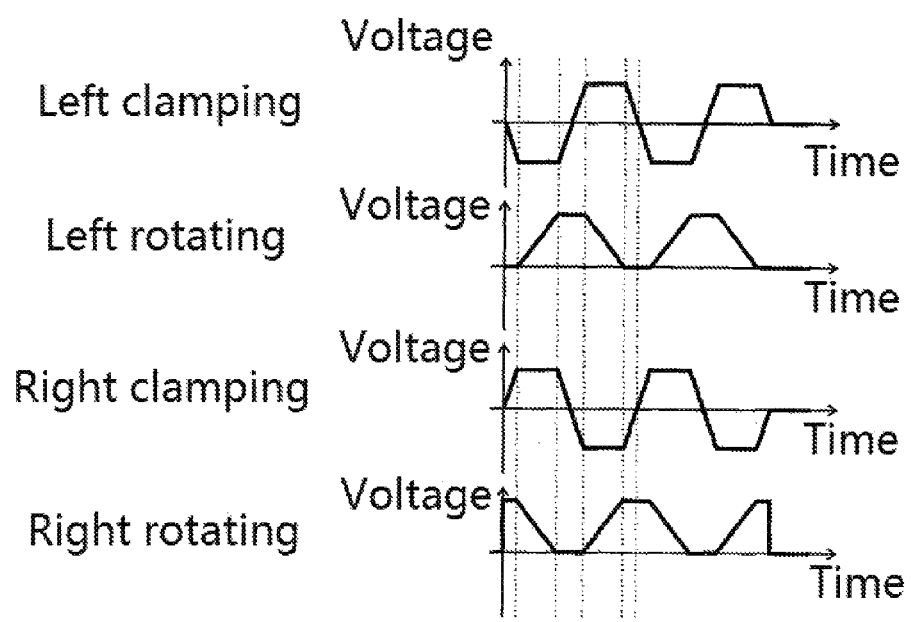
FIG. 10 shows a signal waveform for clamping and rotating control of the micro inchworm-type piezoelectric-driven rotating joint mechanism.

The control signal applied to the two bearing driving modules is shown in FIG. 10. Initially, the two bearing driving modules support the rotating shaft by a certain pre-clamping force. One working cycle includes decomposition processes as follows.

(1) While starting the working cycle, a reverse voltage is applied to the left clamping, four piezoelectric ceramic plates at the left side are stretched due to d31 piezoelectric effect, the bearing driving module 11 at the left side clamps the rotating shaft; a forward voltage is applied to the right clamping, four piezoelectric ceramic plates at the right side are shortened, the bearing driving module 12 at the right side releases the rotating shaft; a forward voltage is initially applied to the right rotating, the bearing driving module at the right side has the slight rotating displacement. However, due to detach from the rotating shaft, the effect from the slight rotating displacement to the rotating shaft is able to be ignored.

(2) The left clamping maintains the reverse voltage, the bearing driving module 11 at the left side maintains the clamping state; the forward voltage is applied to the left rotating, the bearing driving module 11 at the left side drives the rotating shaft to slightly stepping rotate under the action of static friction; the right clamping maintains the forward voltage, the bearing driving module 12 at the right side maintains the release state; the voltage of the right rotating is decreased to zero, the bearing driving module 12 at the right side rotates back to the initial position.

(3) A forward voltage is applied to the left clamping, the bearing driving module 11 at the left side releases the rotating shaft; a reverse voltage is applied to the right clamping, the bearing driving module 12 at the right side clamps the rotating shaft; the left rotating and the right rotating maintain the constant voltage, the positions of the two bearing driving modules and the rotating shaft are constant.

(4) The left clamping maintain the forward voltage, the bearing driving module 11 at the left side maintains the release state; the voltage of the left rotating is decreased to zero, the bearing driving module 11 at the left side rotates back to the initial position; the right clamping maintains the reverse voltage, the bearing driving module 12 at the right side maintains the clamping state; the forward voltage is applied to the right rotating, the bearing driving module 12 at the right side drives the rotating shaft to slightly stepping rotate under the action of static friction.

(5) The reverse voltage is applied to the left clamping, the bearing driving module 11 at the left side clamps the rotating shaft; the forward voltage is applied to the right clamping, the bearing driving module 12 at the right side releases the rotating shaft; the left rotating and the right rotating maintain the constant voltage, the positions of the two bearing driving modules and the rotating shaft are constant. The next working cycle is started.

It can be seen that two bearing driving modules simultaneously achieve the clamping function and the rotating function, alternately drive the rotating shaft to rotate, and one working cycle is able to achieve two stepping motions. When the reverse rotating voltage is applied to two sides, the rotating shaft is driven to reversely stepping rotate.

What is claimed is:

1. A micro inchworm-type piezoelectric-driven rotating joint mechanism, comprising: a U-shaped base having a U-shaped opening and a rotating sleeve horizontally clamped within the U-shaped opening of the U-shaped base, wherein a rotating shaft is rotatably mounted at a central axis of the rotating sleeve, two annular seats are respectively connected with two ends of the U-shaped base and are respectively coaxially connected with two sleeve mouths of the rotating sleeve, two annular bearing pedestals are respectively mounted within the two annular seats, two bearing brackets are respectively connected with an inner annular wall of the two annular bearing pedestals along a certain radial direction, a middle portion of the two bearing brackets is disconnected and is respectively connected with two integrally annular bearing rings, each of which is formed by two half-rings, the two integrally annular bearing rings are concentric with the two annular bearing pedestals, two piezoelectric ceramic plates are respectively symmetrically located at two sides of each of the bearing brackets which is connected with every half-ring of each of the two integrally annular bearing rings, every piezoelectric ceramic plate is parallel to the bearing brackets, one end of every piezoelectric ceramic plate is connected with an inner wall of every bearing pedestal, the other end of every piezoelectric ceramic plate is connected with an end of a half-ring of a bearing ring which is connected with a corresponding bearing bracket, electrodes are respectively deposited at an inner side face of every piezoelectric ceramic plate facing to a corresponding bearing bracket and an outer side face of every piezoelectric ceramic plate away from the corresponding bearing bracket; a bearing pedestal, a bearing bracket, and a bearing ring form a bearing unit; the bearing unit and four piezoelectric ceramic plates form a bearing driving module; two ends of the rotating shaft within the rotating sleeve respectively penetrate through the two bearing rings of two bearing units within the two annular seats; the two bearing rings apply a certain pre-clamping force to the rotating shaft.

2. The micro inchworm-type piezoelectric-driven rotating joint mechanism, as recited in claim 1, wherein two end caps are respectively engaged with an end of the two annular seats away from the rotating sleeve.

3. The micro inchworm-type piezoelectric-driven rotating joint mechanism, as recited in claim 1, wherein every piezoelectric ceramic plate has a single layer structure or a multilayer laminated structure.

4. The micro inchworm-type piezoelectric-driven rotating joint mechanism, as recited in claim 1, wherein every bearing unit is wholly made of stainless steel, and a surface of an inner wall of every bearing ring makes a wear-resistant treatment or is sprayed with a wear-resistant material.

5. The micro inchworm-type piezoelectric-driven rotating joint mechanism, as recited in claim 1, wherein two ends of every piezoelectric ceramic plate are adhesively bonded with both a corresponding bearing pedestal and a corresponding bearing ring via epoxy resin adhesive or AB glue.

6. The micro inchworm-type piezoelectric-driven rotating joint mechanism, as recited in claim 1, wherein the two bearing pedestals are respectively adhesively bonded within the two annular seats via epoxy resin adhesive or AB glue, or are respectively screwed into the two annular seats via a screwing method.

7. The micro inchworm-type piezoelectric-driven rotating joint mechanism, as recited in claim 2, wherein the two end caps are respectively adhesively bonded with an end of the two annular seats via epoxy resin adhesive or AB glue, or are respectively screwed at an end of the two annular seats via a screwing method, or are respectively snapped at an end of the two annular seats via a snap ring method.

* * * * *